United States Patent
Leman et al.

(10) Patent No.: US 10,320,324 B2
(45) Date of Patent: Jun. 11, 2019

(54) METHOD AND DEVICE FOR STARTING AND/OR DRIVING A FAN AT LOW TEMPERATURE

(71) Applicant: Melexis Bulgaria Ltd, Sofia (BG)

(72) Inventors: Dirk Leman, Lier (BE); Iwan Haemers, Leopoldsburg (BE); Robin Ansias, Bertogne (BE)

(73) Assignee: MELEXIS BULGARIA LTD., Sofia (BG)

( * ) Notice: Subject to any disclaimer, the term of this patent is extended or adjusted under 35 U.S.C. 154(b) by 0 days.

(21) Appl. No.: 15/680,746

(22) Filed: Aug. 18, 2017

(65) Prior Publication Data

US 2018/0054152 A1    Feb. 22, 2018

(30) Foreign Application Priority Data

Aug. 19, 2016   (EP) ..................................... 16184957

(51) Int. Cl.
   *H02K 15/14*   (2006.01)
   *H02K 11/25*   (2016.01)
   (Continued)

(52) U.S. Cl.
   CPC ............... *H02P 29/62* (2016.02); *H02P 6/20* (2013.01)

(58) Field of Classification Search
   CPC ............. H02P 6/002; H02P 29/10; H02P 6/28
   See application file for complete search history.

(56) References Cited

U.S. PATENT DOCUMENTS

| | | | | |
|---|---|---|---|---|
| 6,078,158 A | * | 6/2000 | Heeren | G11B 19/20 318/254.2 |
| 6,400,522 B1 | * | 6/2002 | Milligan | G11B 19/2009 360/69 |

(Continued)

FOREIGN PATENT DOCUMENTS

| | | |
|---|---|---|
| DE | 10045291 A1 | 3/2002 |
| EP | 1207520 A2 | 5/2002 |

(Continued)

OTHER PUBLICATIONS

Extended European Search Report From EP Application No. EP16184957.5, dated Feb. 17, 2017.

(Continued)

*Primary Examiner* — Bickey Dhakal
*Assistant Examiner* — Charles S Laughlin
(74) *Attorney, Agent, or Firm* — Workman Nydegger

(57) ABSTRACT

A method of starting and/or driving a fan assembly, the fan assembly comprising a BLDC motor having one or more coils, and a bearing comprising a lubricant. The method comprises performing a special action for intentionally heating up the one or more coils and thereby indirectly heating up the lubricant. The method may comprise measuring a temperature of the bearing, or measuring a value related to said temperature, and performing the special action only if said temperature is below a certain threshold temperature. Performing the special action comprises setting an off-time to a first predefined value and setting an on-time to a second predefined value, the first and second predefined value having a first ratio. Starting the motor comprises setting the off-time to a third value and setting the on-time to a fourth predefined value, the third and fourth predefined value having a second ratio larger than the first ratio.

13 Claims, 12 Drawing Sheets

(51) Int. Cl.
*H02P 9/02* (2006.01)
*H02P 29/62* (2016.01)
*H02P 6/20* (2016.01)

(56) References Cited

U.S. PATENT DOCUMENTS

| | | | | |
|---|---|---|---|---|
| 6,735,035 B1* | 5/2004 | Smith | ................ | G11B 19/2009 |
| | | | | 360/69 |
| 2010/0194326 A1* | 8/2010 | Carlson | .................. | G05B 19/19 |
| | | | | 318/558 |
| 2011/0095717 A1 | 4/2011 | Takizawa | | |
| 2014/0328079 A1* | 11/2014 | Itagaki | .................... | F21V 29/02 |
| | | | | 362/547 |
| 2017/0361676 A1* | 12/2017 | Androulakis | ............ | B60N 2/56 |

FOREIGN PATENT DOCUMENTS

| | | | |
|---|---|---|---|
| EP | 2214069 A1 | 8/2010 | |
| EP | 3059852 A1 | 8/2016 | |
| JP | H0933145 A | 2/1997 | |

OTHER PUBLICATIONS

Lee et al., "A Comparison Study of the Commutation Methods for the Three-Phase Permanent Magnet Brushless DC Motor", Jul. 2016, 7 Pages.

\* cited by examiner

METHOD AND DEVICE FOR STARTING AND/OR DRIVING A FAN AT LOW TEMPERATURE

FIELD OF THE INVENTION

The present invention relates in general to the field of fans for applications which require starting, and/or driving a fan at an ambient temperature down to minus 40° C. (−40° C.), and in particular to automotive applications, but also white box applications such as deep freezers, and to a drive circuit for performing that method, and to a system comprising such a fan and such a drive circuit.

BACKGROUND OF THE INVENTION

Fans comprising a motor and air blades are well known in the art. They are typically used to cool a hot object (e.g. a processor or a hard disk) by forcing an air stream over the hot object, in a manner known as "forced cooling".

Different kinds of motors are used in a fan, ranging from a single coil motor to a three coil motor. Both DC motors (with brushes) and brushless DC motors (BLDC) are typically used.

As BLDC motors do not have brushes, they typically create less noise and less wear than their DC counterparts, but the currents of such a motor need to be applied by a driver circuit according to a suitable "commutation scheme", meaning that the amplitude and/or direction of the currents flowing through each of the coils needs to be adjusted depending on the angular position of the rotor to make the motor move as desired (e.g. to start the motor, accelerate, decelerate, maintain constant speed, etc.). Despite the more complex driving scheme, BLDC motors are often chosen because they are less subject to wear.

There are three major categories of schemes for driving BLDC motors:

(1) The first and most complex driving scheme is known as "Field Oriented Control" (FOC), in which case an optimal vector is calculated in real time based on up-to-date information about the motor and its load. This scheme typically requires a fast digital signal processor (DSP) which is typically too expensive for fan applications.

(2) The second scheme (medium complexity) approximates or emulates FOC by applying sinusoidal currents, and is typically based on look-up tables and only partial information about the motor and its load. Two implementations typically fall in this category: (a) Sine-wave BLDC motor control, which uses motor information to achieve high efficiency, and (b) so called "micro-stepping", where the sinusoidal waveform is approximated by a small number of steps. Micro-stepping can be used when efficiency is less critical. Both schemes can be generated by a relatively simple microcontroller with dedicated motor control hardware (such as PWM blocks).

(3) The third category (lowest complexity) uses "trapezoidal waveforms".

A nice overview of these commutation methods is described in the paper "A COMPARISON STUDY OF THE COMMUTATION METHODS FOR THE THREE-PHASE PERMANENT MAGNET BRUSHLESS DC MOTOR" by Shiyoung Lee and Tom Lemley (7 pages).

It shall be clear that many different designs of motor drive circuits exist, and different trade-offs can be made, not only in terms of maximum power or maximum current, but also in terms of energy efficiency, torque ripple, acoustical noise, but also in terms of functionality, such as for example guaranteed start-up behaviour, or the ability to control the motor speed (or not), or the ability to detect motor stall (or not), etc. It is noted that for some fan applications it suffices that the motor runs at a substantially predefined constant speed, while other fan applications require speed control.

In many applications, the main consideration is energy or power efficiency. The aspect of power efficiency is not only important for battery powered devices (such as laptops) but also for reducing emission of combustion engines of vehicles. It is evident that no electrical energy should be wasted, hence many existing drive circuits are designed to drive the motor in the most energy-efficient manner. This usually also results in a reduced heat dissipation, requires lower currents, lower drive capabilities, and thus typically results in lower hardware and/or package costs.

Some motor driver circuits are designed to address specific problems. For example, EP16154767 (filed by the same applicant) describes a relatively sophisticated drive circuit for driving a fan at a variable speed according to specific requirements, where the design is based primarily on considerations of torque and acoustical noise.

The present invention is related to another specific problem, namely to provide a low cost driver circuit, especially designed for starting and/or driving a fan in the automotive temperature range from −40° C. to +85° C. or higher, and is particularly related to problems encountered at the bottom end of this temperature range.

SUMMARY OF THE INVENTION

It is an object of embodiments of the present invention to provide a method and a device for starting and/or driving a fan, in particular a fan of the type having air blades, in an automotive environment, at an ambient temperature down to −40° C. (minus 40° C.), and to a system comprising such a fan and such a drive circuit.

It is an object of particular embodiments of the present invention to provide a simple method and a simple device, that provides a more reliable and/or an improved start-up behaviour, especially at temperatures down to −40° C., and preferably without requiring a programmable microcontroller or a DSP.

These objectives are accomplished by a method and a device according to embodiments of the present invention.

In a first aspect, the present invention provides a method of starting and/or driving a fan assembly, e.g. at a low ambient temperature, e.g. below the freezing temperature of water, such as down to −40° C., the fan assembly comprising a BLDC motor having one or more coils, and a bearing comprising a lubricant; the method comprising the step of: performing a special action for intentionally heating up the one or more coils when starting the motor, and/or performing a special action for intentionally heating up the one or more coils while driving the motor; starting the motor and driving the motor in a manner different from the special action.

Depending on the specific implementation, the "special action" can be performed before actually starting the motor, and/or while initially driving the motor.

Performing the special action comprises setting an off-time to a first predefined value, TOFF1, and setting an on-time to a second predefined value, TON1, the first and second predefined value having a first ratio, R1. Starting the motor comprises setting the off-time to a third value, TOFF2, and setting the on-time to a fourth predefined value, TON2, the third and fourth predefined value having a second ratio, R2, larger than the first ratio R1. In an embodiment, the method comprises the steps of: a) determining an initial value indicative of a temperature of the bearing; b) comparing the initial value with a predefined threshold value, and * if the result of the comparison indicates that the temperature of the bearing is lower than a predefined temperature, performing the special action for intentionally heating up the one or more coils; and * if the result of the comparison indicates that the temperature of the bearing is higher than a predefined temperature, skipping the special action.

In an embodiment, performing the special action comprises performing a pre-heating by energizing the one or more coils in a manner to heat up the coils while keeping the motor substantially still.

In an embodiment, performing a pre-heating comprises: applying an energizing scheme to energize the one or more coils using at least two positive energizing pulses and at least two negative energizing pulses during a predefined time duration corresponding to an expected time of a first phase.

In an embodiment, the total duration of the at least two energizing pulses during the pre-heating is at least 250 ms or at least 500 ms or at least 1.0 s or at least 2.0 s.

In an embodiment, the second predefined value and the fourth predefined value may be the same, and the first predefined value may be smaller than the third predefined value, for example at least a factor 2 smaller.

In an embodiment, performing the special action comprises setting a driving parameter to a first value which is intentionally not optimal for energy efficiency; and driving the motor comprises setting the driving parameter to a second value different from the first value, which is substantially optimal for energy efficiency.

In a second aspect, the present invention also provides a motor drive circuit, comprising: a timer unit; an energizing unit for energizing the one or more coils; control logic adapted for performing the method according to the first aspect.

In an embodiment, the motor drive circuit further comprises: sensing means for determining an initial value indicative of a temperature of the bearing; means for comparing the initial value with a predefined threshold value.

In a third aspect, the present invention also provides a system comprising: a motor driver circuit according to the second aspect; and a fan assembly comprising a BLDC motor having one or more coils, and a bearing comprising a lubricant.

In another aspect, the present invention also provides the use of a method according to the first aspect for starting and/or driving a motor at temperatures down to minus 40° C.

In another aspect, the present invention also provides the use of a method according to the first aspect for starting the motor of an LED headlight fan of a wheeled vehicle at temperatures down to minus 40° C.

In another aspect, the present invention also provides the use of a method according to the first aspect for driving the motor of a seat-heating-fan of a wheeled vehicle.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 5(a) shows a typical Hall sensor signal as a function of time (or angular position).

FIG. 5(b) shows corresponding energizing signals applied to the coil.

FIG. 6(a) shows a typical Hall sensor signal as a function of time and two voltage threshold levels.

FIG. 6(b) shows corresponding energizing signals applied to the coil.

Figure 1:
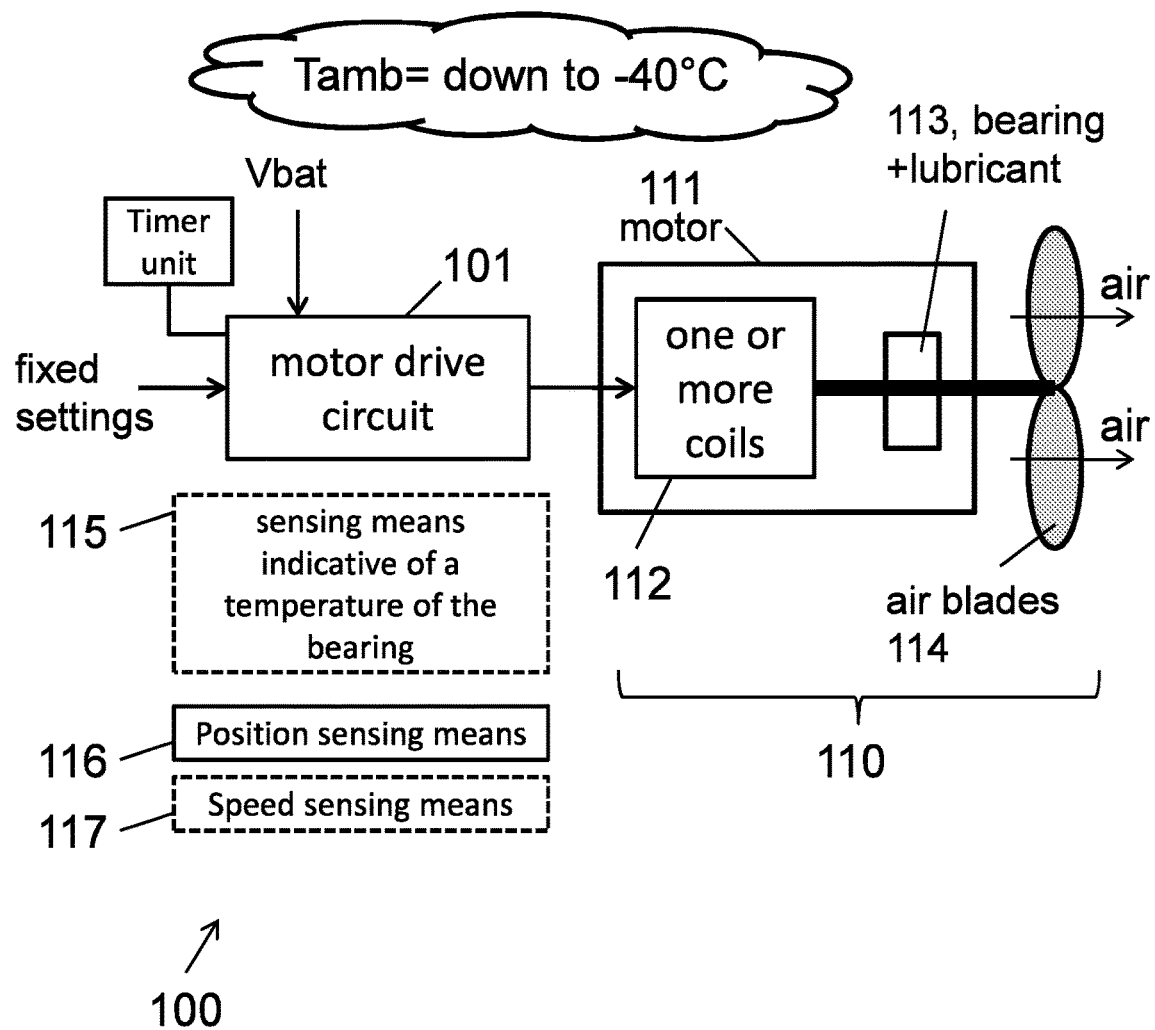
FIG. 1 shows a high-level block diagram of a system according to the present invention, the system comprising a drive circuit and a fan.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in this document reference is made to "normal mode", what is meant is a classical algorithm of starting and/or driving a BLDC motor. Such an algorithm is typically optimized for maximum energy efficiency.

Where in this document reference is made to "special mode", what is meant is an algorithm of starting and/or driving a BLDC motor in a manner especially adapted for deliberately heating-up (or further heating up) the parts of the fan motor more than is the case in the "normal mode".

It is noted that methods according to the present invention have at least two different modes, or blocks that can operate in at least two different modes, one "normal mode" which is an energy efficient" mode, and one "special mode" which is deliberately not energy efficient, hence, the words "normal" and "special" have no absolute meaning, but only a relative meaning as two different modes of operation.

FIG. 1 shows a high-level block diagram of a system 100 comprising a motor drive circuit 101 and a fan assembly 110.

The motor drive circuit 101 is adapted for providing one or more energizing signals (for example voltage signals or current signals) to the fan assembly 110. The motor drive circuit 101 typically comprises an integrated circuit with an embedded driver stage (not explicitly shown), but alternatively a separate driver stage can also be used. Suitable driver stages are known in the art. They typically comprise a number of power transistors, typically four in the case of a single coil motor, two in the case of a dual coil motor, and typically six in case of a three-phase motor.

The present invention is directed to a fan system in an automotive environment, thus the motor drive circuit 101 would receive a supply voltage Vbat originating from a battery of a vehicle, and has to work reliably in a temperature range from −40° C. to at least +85° C. (for example to +120° C.).

The motor drive circuit 101 is typically an integrated chip which may be completely dedicated, or may be configurable, for example using one or more configuration pins connected to one or more external components (such as by pull-resistors or pull-down-resistors, or by a resistor having a specific resistance value, or a capacitor, etc.), or by means of one or more values being hardcoded or being stored in an internal or external non-volatile memory (e.g. eeprom or flash) or by means of one or more fuses, etc.

The fan assembly 110 comprises a motor 111, in particular a brushless DC motor (BLDC) having a rotor and a stator (not explicitly shown in FIG. 1), and one or more coils 112, and one or more bearings 113 containing a lubricant, the lubricant having a viscosity that changes with temperature. The motor 111 typically also comprises a shaft and a propeller comprising air blades specifically shaped for blowing air, but that is not the main focus of the present invention, and will not be described in more detail, because fan assemblies are well known in the art. For the present invention its suffices to know that the motor 111 has one or more coils 112 and one or more bearings 113 having a lubricant with a viscosity that is temperature dependent, and that there is a heat transfer path (directly or indirectly) from the coils to the bearing(s), or from other parts of the motor which are heated when current flows through the coils (e.g. through eddy currents in the laminated stator stack). The principles of the present invention will work with a single coil motor, a dual coil motor, and a three-phase motor, or motors having more than three coils.

Referring back to FIG. 1, the system 100 may further comprise a means for sensing a value indicative of the bearing temperature. This could be a temperature sensor mounted on the bearing but such solution is quite expensive, and therefore several other options are envisioned, for example:

1) a temperature sensor mounted at a location near the bearing.

2) but instead of using an actual temperature sensor, it is also possible to measure a resistance value of the coil, because the coil resistance is dependent on temperature, and the temperature of the coil is related to the temperature of the bearing, albeit with some time delay and some temperature difference. If the coil temperature sensing is done by applying a predefined current or voltage level, such measurement can be implemented with minimum overhead in the IC since it can reuse similar functions as are used for driving the fan. As a disadvantage the sensing may only be possible before starting the fan operation, so no updated information is available in case the special algorithm needs to be applied during a longer and unknown period of time. In a similar way the forward voltage of a diode on the driver circuit 101 itself can be used as a temperature sensor indicative of the bearing temperature, since typically the fandriver is located in close proximity of the fan bearing.

It is noted in this respect that the momentary relation between the temperature of the temperature indicator or temperature sensing means on the one hand, and the temperature of the bearing on the other hand, need not be a highly accurate relation under all conditions, but it suffices that after a sufficiently long inactive period (e.g. at least 15 minutes) and before a first start-up attempt, the temperature difference between the temperature sensing means and the bearing is sufficiently small, for instance less than 20° C.

3) Due to the logarithmic scale of the change in viscosity over temperature, the start up torque needed to rotate the fan at low speeds at minus 40 C, can for example be ten times higher than the start-up torque needed to rotate the fan at the same low speed but at room temperature. The friction load is much higher than the load incurred by the fan blades moving the air. Therefore the load current at start up is also a relevant indicator of the fan bearing temperature. A disadvantage of this "temperature indicator" however is that it will only work when the motor is actually moving.

The system 100 further comprises a position sensing means 116, for example an angular position sensing means. This can for example be a Hall sensor. With "position" or "angular position" the "angular position of the rotor" is meant.

The system 100 may optionally also comprise a speed sensing means 117, although this is not absolutely required since the speed can be calculated as the time derivative of the angular position.

It is noted that one or more of these sensing means 115, 116, 117 may be part of the drive circuit 101, or may be external to the drive circuit 101 but connected thereto. One or more of these means can be implemented in hardware or in software.

The position sensing means 116 can for example be a magnetic position sensing means (e.g. comprising one or more Hall elements), or can be an optical position sensing means, or can also be implemented in a sensorless manner, for example based on a back-EMF signal.

The speed sensing means 117 can be an individual component, or can for example be generated as the time-derivative of the position signal.

The temperature sensing means 115 may comprise a dedicated temperature sensor, which may be integrated in the motor drive circuit 101 (e.g. based on a junction temperature) or may be an external temperature sensor, like an NTC located close to the bearing.

In particular embodiments, the sensing means 115 is a means for measuring an electrical resistance of the one or more coils 112, from which resistance value a temperature value can be derived, e.g. by taking into account a value of the electrical resistance measured during an End-Of-Line (EOL) test at a known temperature, and stored in a volatile memory, or as a hard-coded value, or in any other way, and taking into account a predefined temperature dependence of the electrical resistance, for example using a lookup table or a predetermined mathematical function. As will become clear further, however, such calculation is not absolutely required, and the algorithms of the present invention can also be based on the electrical resistance value itself or on a temperature value, or both.

Figure 10:
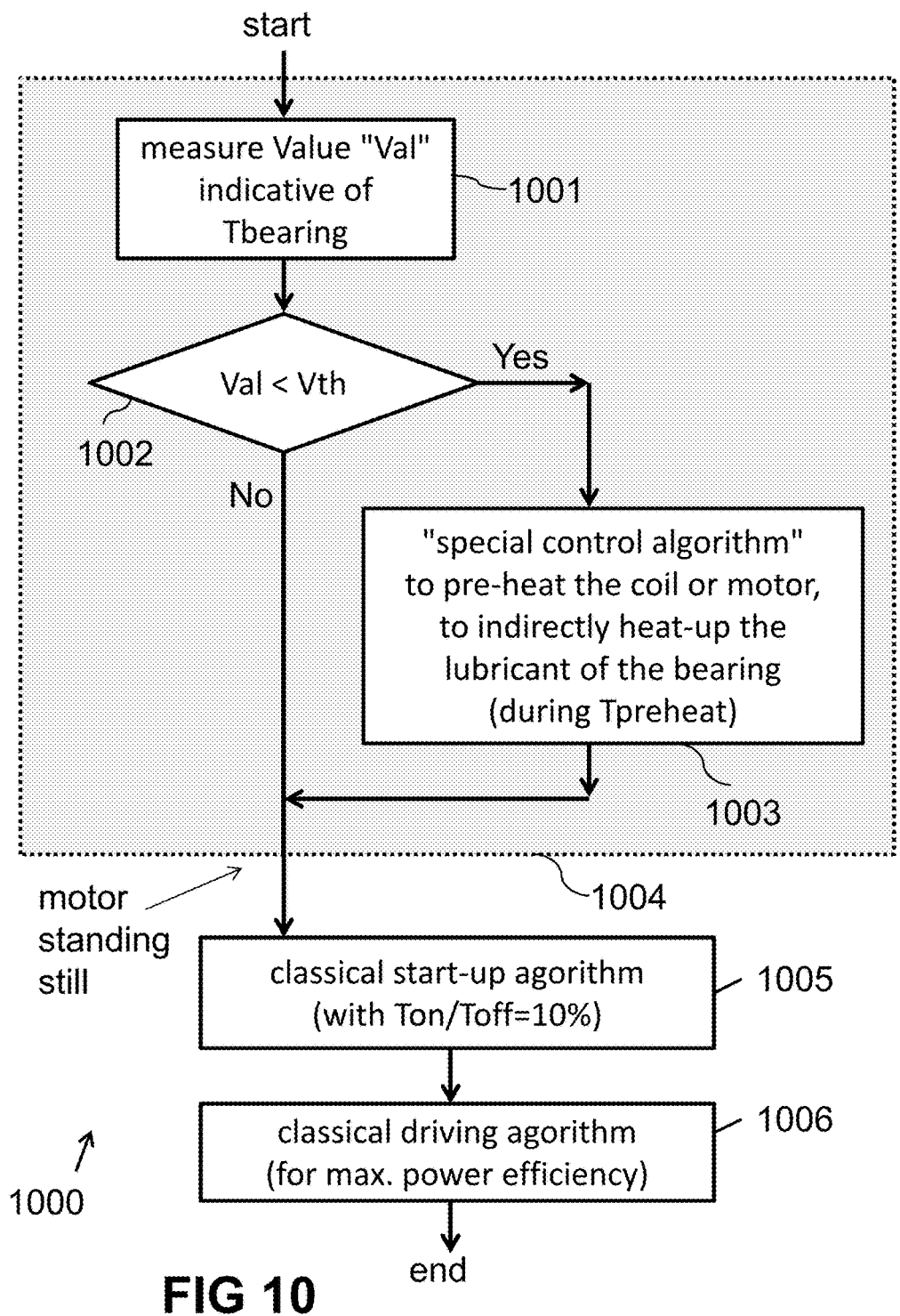
FIG. 10 shows a first embodiment of a method according to the present invention, having different modes of operation: a "normal mode" for starting and/or driving the fan in a classical manner, and a "special mode" for starting and/or driving the motor in a manner that deliberately heats-up the coil(s) and/or other parts of the motor more than in the normal mode, for the purpose of heating up the lubricant of the bearing. Which mode is chosen depends on the outcome of a test.

In embodiments of the present invention the temperature sensing means 115, e.g. the voltage measurement means (for measuring a forward junction voltage) or for measuring an electrical resistance need not be accurate over the full temperature range from −40° C. to +120° C., but it suffices that the system 100 is capable of determining whether the measured temperature and/or measured voltage and/or measured electrical resistance, or any other value indicative of the bearing temperature, is below a predefined threshold value "Vth" (see FIG. 10). In case a temperature value is used, Vth can for example be chosen to be equal to about −15° C. or about −20° C. or about −25° C. or about −30° C.

or about −35° C. or any other suitable value. The exact value of the threshold value Vth is not critical for the present application.

As will become clear further, and stated in simple terms, the idea behind the "sensing means for measuring a value indicative of the bearing temperature" is that systems having such temperature sensing means should be able to detect a "relatively cold condition", for example corresponding to a temperature lower than 0° C. or lower than −10° C., in which case a lot of heating can be supplied to the coils without running the risk of overheating. It can be understood that there is no "hard limit", which is why the algorithms presented further work well, even if the boundary of the temperature range is not highly accurate. Indeed, especially after a relatively long stand-still (e.g. at least 15 minutes in a freezing environment), the outcome of the test will typically be correct, and according to principles of the present invention, in that case "special measures" can be taken to heat the lubricant (albeit indirectly), in order to help start-up and/or drive the motor.

Figure 2:
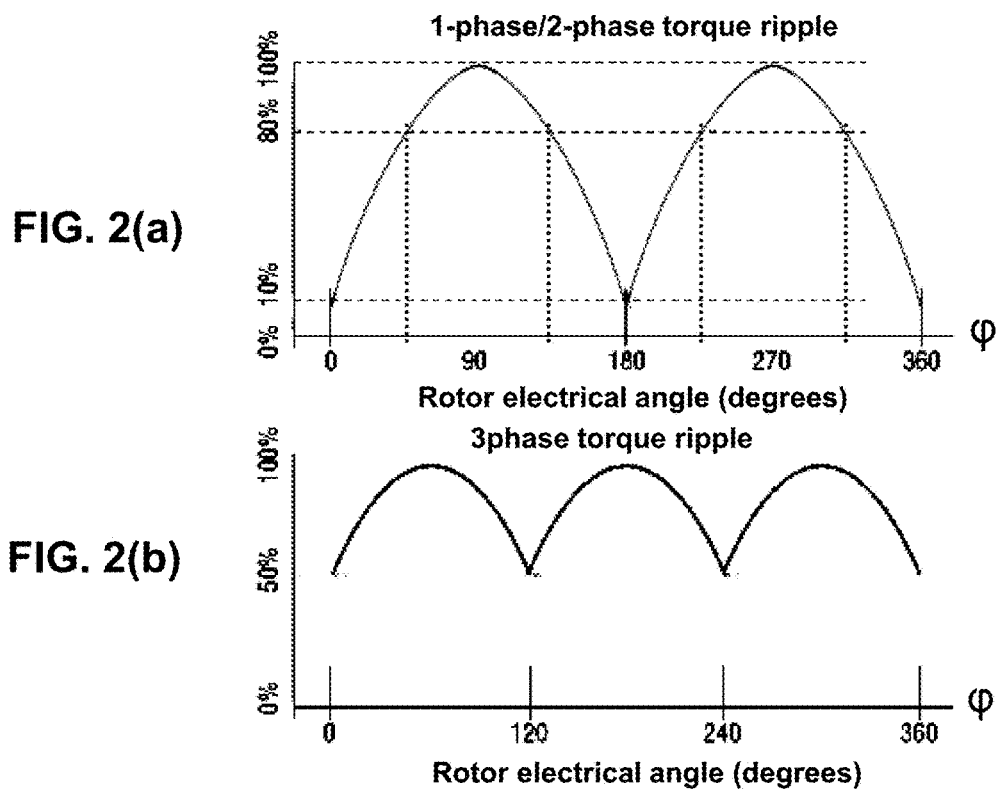
FIG. 2 shows a typical torque as a function of angular position for a single phase or two-phase motor (FIG. 2A) and for at three-phase motor (FIG. 2B), known in the art.

FIG. 2 shows a typical torque as a function of angular position for a single phase or two-phase motor (FIG. 2A) and for a three-phase motor (FIG. 2B), which curves are known in the art. As can be appreciated from these figures, the torque exerted by the coil(s), even when a maximum current is flowing through the coil(s), is relatively low in the start position ($\varphi=0$), especially for a single-phase and a two-phase motor. This is one of the main reasons of start-up problems of single coil and two-coil motors. It also means that a small increase of the load, for example due to mechanical wear, or because of the increased viscosity of the bearing lubricant at low temperatures, reduces the chance of a guaranteed start-up at a first attempt.

Thus, the inventors of the present invention were confronted with the problem of unreliable start-up of BLDC motors in general, and in particular at temperatures as low as −40° C., for example in automotive applications where low-cost BLDC motors are increasingly being used inter alia for LED headlight cooling and seat heating, but the problem is not limited to this field, and also occurs for example for some domestic appliances, such as for example deep freezers or other cooling equipment.

The problem of unreliable start-up of BLDC motors at temperatures as low as −40° C. per se, is known in the art, and is currently being addressed in several ways.

A first approach is to overdesign the drive circuit such that it can deliver a higher torque than required at temperatures higher than −20° C.

Figure 8:
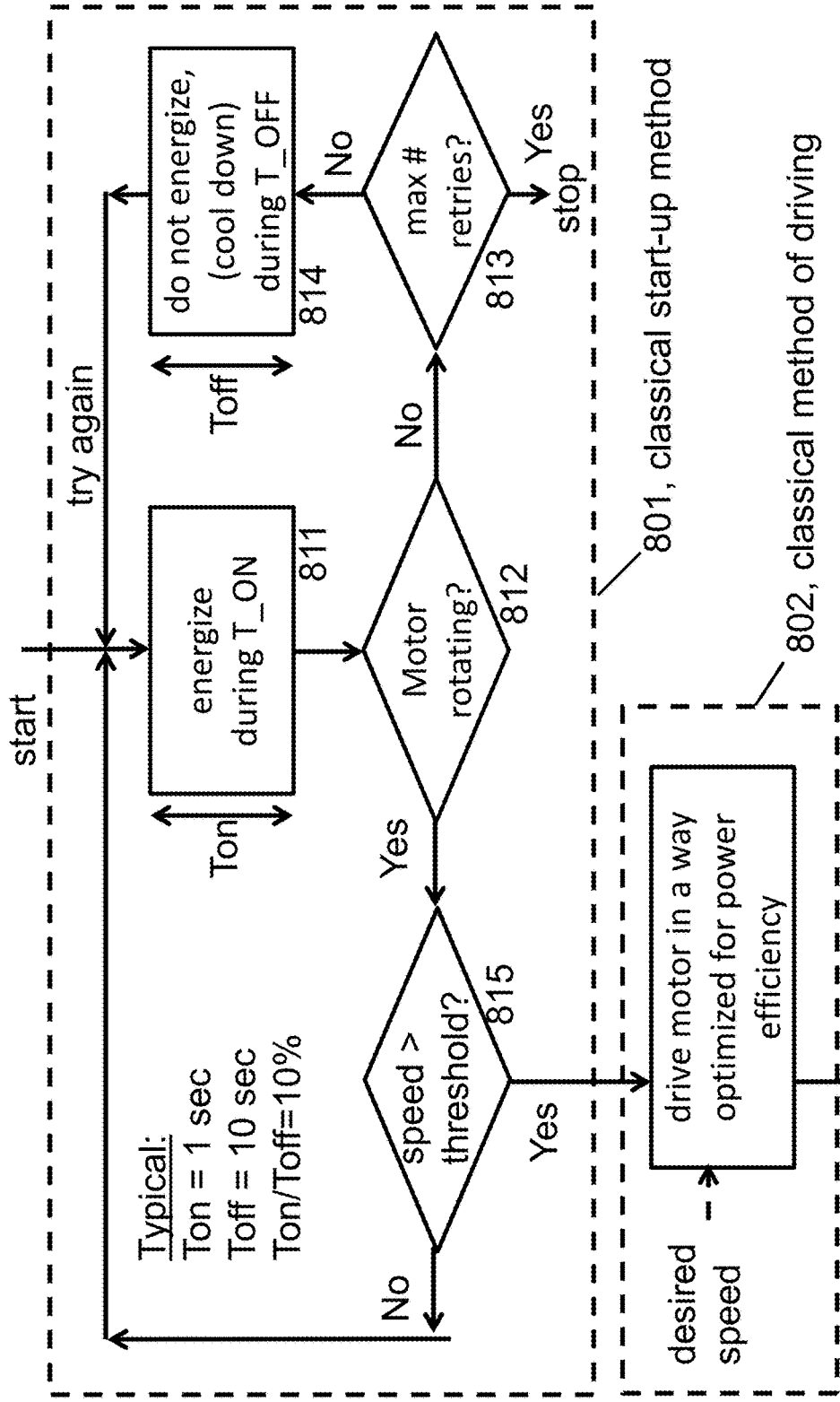
FIG. 8 is a flowchart representing a control algorithm for starting (upper part) and for driving (lower part) a fan motor, known in the art. The algorithm includes several retries in case the motor does not start from the first time. After each failed attempt to start the motor during a so called "TON-time", a predefined "TOFF-time" is waited to prevent thermal shutdown and/or to allow the motor to come to a complete stop before retrying.
Figure 9:
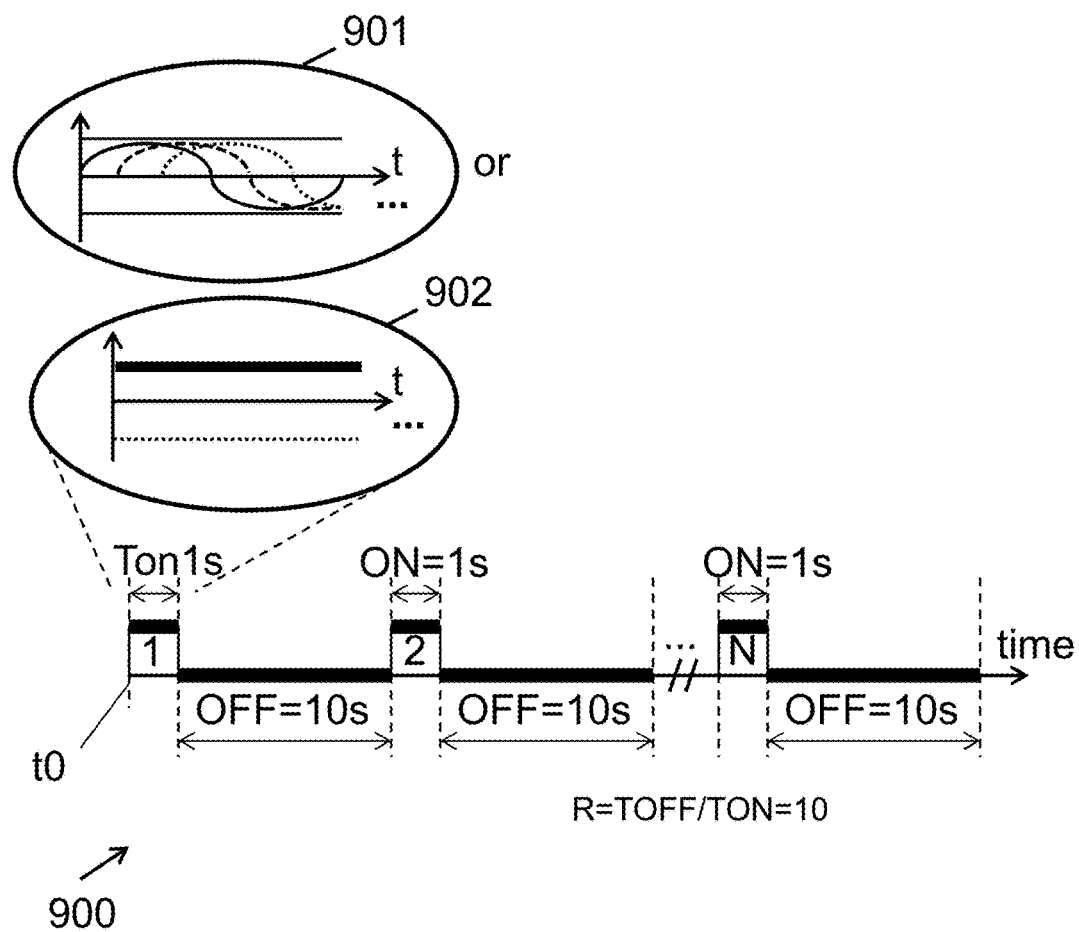
FIG. 9 is a high-level representation of an exemplary energizing scheme applied to the motor using the algorithm of FIG. 8 with TON=1.0 s and TOFF=10 s. During the OFF periods, no energy is supplied to the motor coils for allowing cool-down. During the ON periods, energy is supplied to the motor coils in a suitable manner (or example as shown in FIG. 5 or FIG. 6).

A second approach is to try to start-up multiple times rather than a single time, by merely repeating the same start-up algorithm over and over again, but without doing special things. This approach is illustrated in FIG. 8 and FIG. 9, and will be discussed later.

Figure 3:
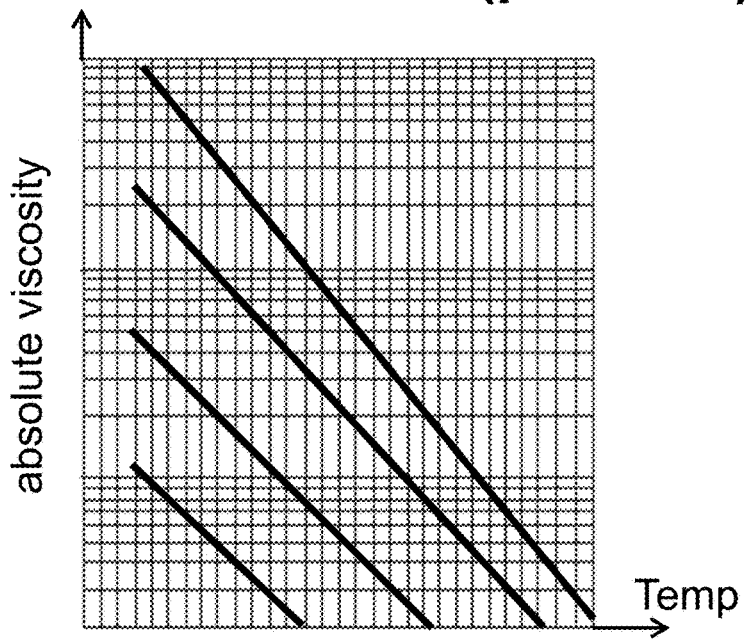
FIG. 3 is graph showing a few curves to illustrate how the viscosity of a lubricant of a bearing typically varies with temperature, for a few different lubricants of a different grade.

When the inventors of the present invention investigated the problem of unreliable start-up of BLDC motors at temperatures down to −40° C., they found that one of the underlying reasons for unreliable start-up is related to the viscosity of the lubricant of the motor bearings, which increases as the temperature decreases, as is illustrated in FIG. 3.

Indeed, FIG. 2($a$) and FIG. 2($b$) do not reveal that the load caused by the lubricant in the bearings typically increases by two orders of magnitude (i.e. a factor of about 100) when the temperature decreases from about +25° C. to about −40° C. This is true not only for single-coil or two-coil motors, but also for three-coil motors.

As can be seen in FIG. 3, the viscosity of a particular lubricant can be represented by a straight line, when shown on a dual-logarithmic plot. While it is known in the art that viscosity of lubricants increases with decreasing temperature, the link between an increase of the viscosity and unreliable start-up does not seem to be fully appreciated in the art, or at least, no solutions seem to be provided which is specifically directed to reducing the viscosity of the lubricant, for example by means of a dedicated heater, probably because that is not a commercially viable solution for low cost fan systems. However, the inventors came to the idea of heating or warming-up the lubricant indirectly, without significantly increasing the system cost.

Before describing specific solutions proposed by the present invention, first some other aspects of driving a fan motor are discussed.

Figure 4:
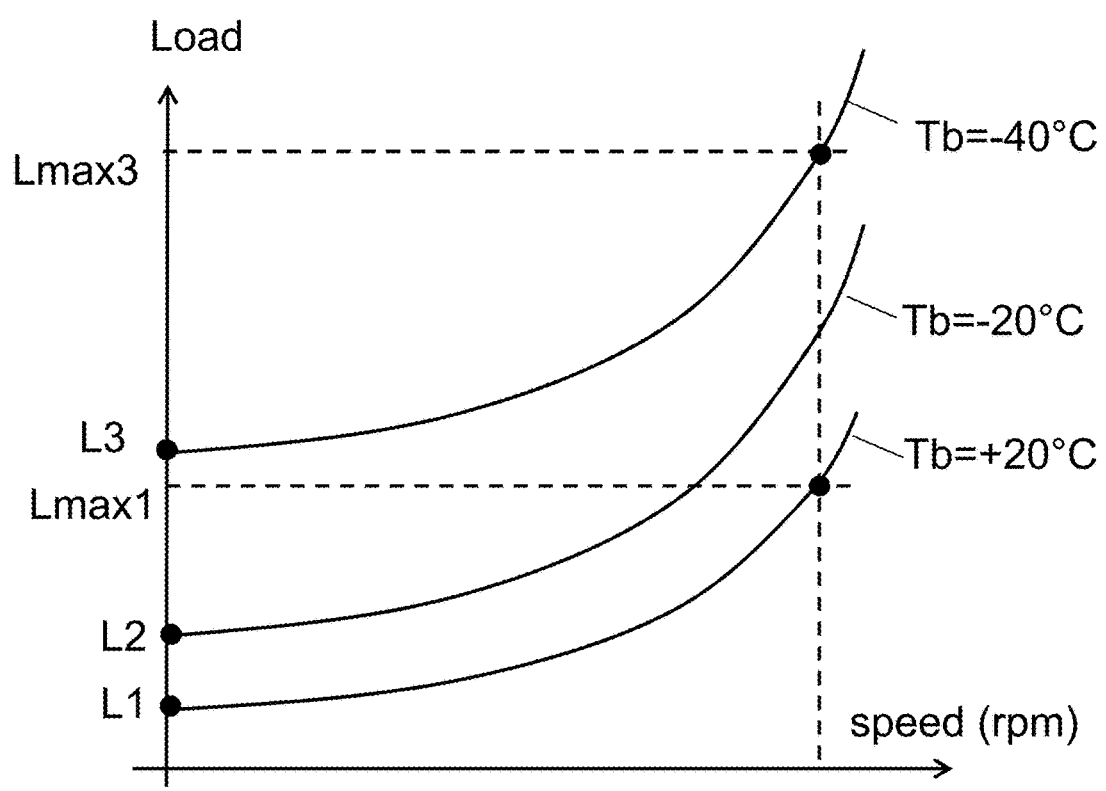
FIG. 4 shows three exemplary curves to illustrate how the load of a fan typically varies as a function of angular speed, for three different bearing temperatures, taking into account the load due to resistance of the air as a function of speed (especially relevant at high speed), and taking into account the load due to viscosity of the lubricant of the bearing (especially relevant at low temperature).

FIG. 4 shows three exemplary curves of how the load of the fan typically varies as a function of angular speed, for three different temperatures, taking into account the load encountered by the blades of the propeller due to resistance of the air flow (which manifests itself typically as a second or third power of the motor speed) and taking into account the load due to the viscosity of the lubricant of the bearing, which is particularly important for low temperatures. These curves are qualitative exemplary curves to illustrate the principles, but they are not drawn to scale.

Prior art solutions based on "overdesign" will provide a circuit capable of providing a higher current and thus torque, corresponding to the value "Lmax3" to be able to reach the maximum predefined speed even at the lower temperature (for example −40° C.), whereas the solutions proposed by the present invention are not based on over-designing the circuit, but on finding other techniques for reliably starting and/or driving the motor, without increasing drive capability. Thus solutions of the present invention are capable of starting and/or driving the fan motor despite a limited torque capability "Lmax1" corresponding to the maximum predefined speed at "normal" temperatures (for example +20° C.), albeit not immediately at full speed.

Figure 5:
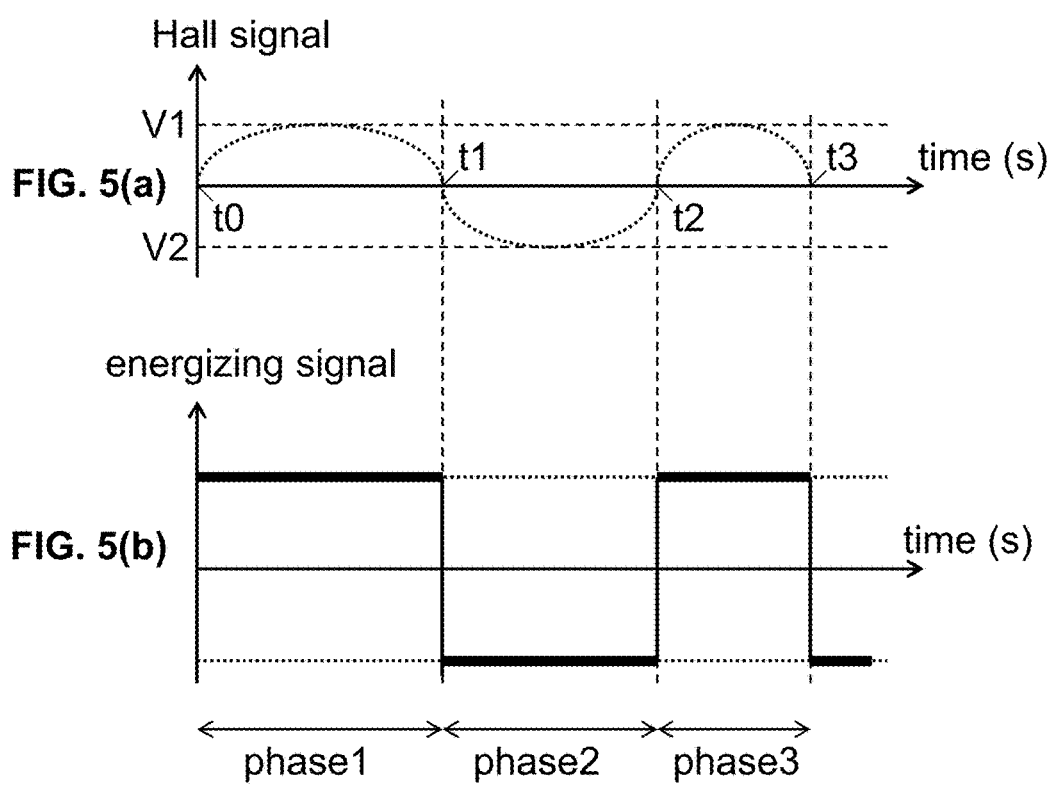
FIG. 5 shows a simple commutation scheme of a single-coil motor, known in the art.

FIG. 5 shows a simple commutation scheme of a single-coil motor, known in the art. FIG. 5($a$) shows a typical Hall sensor signal as a function of time (or angular position), assuming the motor is accelerating. FIG. 5($b$) shows corresponding energizing signals applied to the coil.

The following is typically done in practice. At time t0, an energizing signal is applied to the coil, which (if everything goes right) causes the motor to accelerate in a particular direction. A Hall sensor, suitable arranged with respect to the rotor provides a signal as shown in FIG. 5($a$), which signal resembles a sinusoidal signal (if the distortion due to the acceleration is not taken into account). At time t1, when the rotor has rotated over 180°, the first "phase" is completed, and the Hall signal changes sign. This is typically detected by a comparator in the motor driver, which adjusts the energizing signal accordingly. In the example of a single phase coil, a maximum current in the opposite direction is applied, which will further accelerate the motor, until the second phase "phase2" is completed, etc. Changing the currents in the coils is known as "commutation". In the example of FIG. 5, it is assumed that either a positive current of maximum amplitude is applied, or a negative current of maximum amplitude, a technique known as "hard switching". In practice, the current cannot change instantly, but changes exponentially, but that aspect is irrelevant for the present invention.

Figure 6:
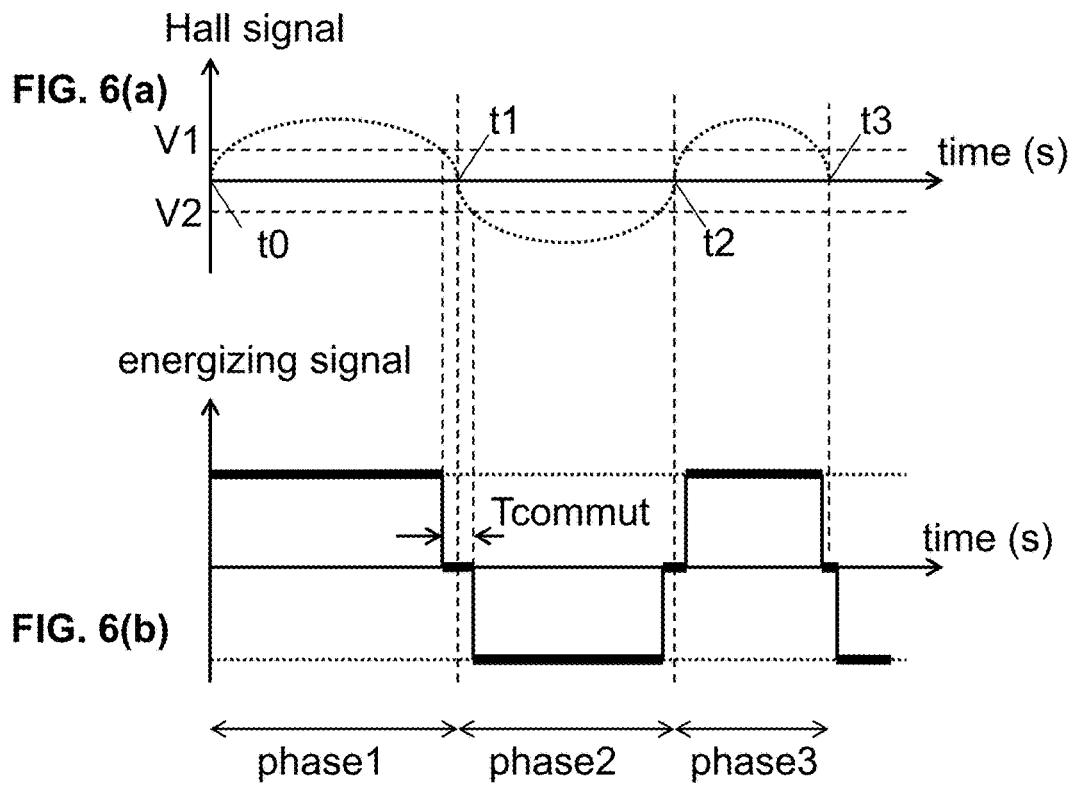
FIG. 6 illustrates a second commutation scheme of a single-coil motor, known in the art.

Many variants of the basic scheme of FIG. 5 exist. For example, FIG. 6 illustrates another commutation scheme of a single-coil motor, known in the art, where the current is not abruptly changed from maximum positive to maximum negative and vice versa, but an intermediate level, referred to herein as "dead zone", is used. This can for example be implemented by comparing the Hall signal with two threshold levels V1, V2 which may but need not be the same in absolute value. While the zero-crossing of the Hall signal typically lies in the middle between the two voltage levels V1, V2, that is not absolutely required, and a slightly asymmetrical dead-zone would also work. But other techniques, where the transition from maximum positive to maximum negative current is more gradual, are also known. These techniques are referred to as "soft switching techniques". While these techniques are not the main focus of the present invention, it is important to realize that there is a difference between the "dead zone" (referred to herein as the commutation-time "Tcommut", typically in the order of milliseconds or microseconds) and a so called "OFF-time" or "cool-down time", which in prior art methods is typically in the order of 10 seconds, or is typically at least 5 times, e.g. about 10 times longer than the "ON-time", which is the time during which the fan tries to start. If no Hall-commutation is detected within this ON-time, the fan will typically go into so-called "Locked Rotor Position" (LRP), and will stop energizing the fan, as will be explained further.

Figure 7:
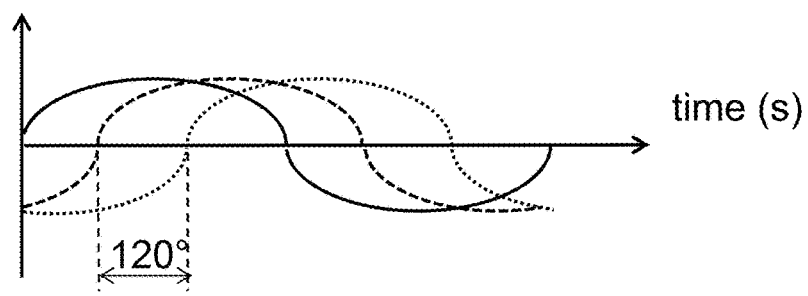
FIG. 7 shows an exemplary set of three sinusoidal waveforms as may be used to start and/or drive a three-phase BLDC motor.

FIG. 7 shows an example of three sinusoidal waveforms as can be applied to a three-phase BLDC motor. Alternatively, trapezoidal waveforms may be used. Although the orientation of the magnetic field generated by the three simultaneous currents in the coils can be changed gradually when starting the motor from stand-still (which is not possible with a single or dual coil motor), the start-up problems at low temperatures due to a viscosity increase of the lubricant is also encountered in three phase motors.

For completeness, it is worth to mention that, if the motor did start-up and is running at a certain speed, the timing of the commutation is important for energy efficiency. While in FIG. 5 the moment of commutation coincides with the zero-crossing of the Hall signal, in practice this is not always the most efficient moment, and the driving waveform may be slightly shifted over a so called "lead angle". Although different definitions for "lead angle" are being used in the industry, these differences being mainly related to the reference points being used for measuring the angle, but the principle that the entire waveform is shifted over "an" angle, in order to obtain a target energy efficiency, is the same. In some cases on-purpose a lower energy efficiency is accepted in exchange for squeezing some extra speed out of the motor. In the field of FOC this is referred to as "field weakening". In some applications a so called stepper mode is applied. In this mode the speed is imposed by the driver with a predefined torque. So unlike in typical BLDC operation which is targeted at control of the lead angle, in this mode the lead angle is depending by the load torque. This aspect is relevant for the method illustrated in FIG. 15.

As is also known in the art, the energizing waveforms may be stored in non-volatile memory and replayed, or otherwise generated by a drive-circuit according to the present invention, using for example an analogue state-machine or a digital state-machine or any other suitable circuitry.

FIG. 8 is a flowchart showing a control algorithm 800 for starting (upper part 801) and for driving (lower part 802) a fan motor, known in the art.

In step 811, when starting the motor, one or more energizing signals are applied to the one or more coils, for example as shown in FIG. 5 or FIG. 6 or FIG. 7 or any other suitable signals. In case trapezoidal or sinusoidal waveform are applied, these would typically be varied over time according to predefined timing for which it is expected that the motor can follow. But in case of a single coil motor, if the motor is stuck, the coil is constantly energized (e.g. at maximum current) for a predefined "ON-period" TON, typically chosen equal to about 1.0 seconds.

In step 812, it is tested whether the motor is running, for example by testing the back-EMF signal or testing whether a signal from the Hall sensor (if present) occurred, or in any other suitable way.

If the outcome of the test of step 812 is that the motor is not running (branch "No"), it is tested in step 813 whether a maximum number of retries has already been performed, and if that is the case (branch "Yes"), no further attempts to start the motor are undertaken. If that is not the case (branch "No") in step 814 no energizing signal is provided for a predefined OFF-time "TOFF", typically 10 seconds, for allowing the motor to cool down, after which a new attempt to start the motor is taken.

If the outcome of the test of step 812 is that the motor is running (branch "Yes"), it is tested in step 815 whether the motor has already reached a predefined threshold. And if the speed has not yet reached that threshold (branch "No"), energizing simply continues, taking into account appropriate commutation, as described above. If some time later the result of the test in step 815 is that the motor has reached the predefined minimum speed, then the "start-up" algorithm 801 is completed, and a "driving algorithm" 802 takes over, where basically the same commutation principles are applied, but additionally some parameters such as "lead angle" LA may be optimized for optimal energy efficiency, and/or additional functionality may be provided, such as speed control, just to name a few.

As can be seen, the algorithm includes several retries in case the motor does not start from the first time. After each failed attempt to start the motor during a so called "TON-time", a predefined "TOFF-time" is waited to prevent thermal shutdown and/or to allow the motor to come to a complete stop before retrying.

In a variant of the method, step 815 can be based on an elapsed time being larger than a predefined time period, rather than speed being higher than a predefined speed.

FIG. 9 shows an exemplary waveform (or set of waveforms) to illustrate the principle of TON and TOFF. As far as is known to the inventors, in the prior art the time during which the one or more coils are energized, known as ON-time or "Ton" is typically chosen in the order of 1.0 seconds, and the time between two energizing periods to allow the motor to cool down in case the motor did not start, known as TOFF is typically chosen in the order of 10.0 seconds, typically a factor of about 10 larger than the TON-time, sufficiently large to allow the motor, and in particular the coils to cool down, to prevent shorting between coil turns due to melted isolation. Hence, the ratio of TON and TOFF in prior art solutions is in the order of TON/TOFF=about 10%. Moreover, as far as the inventors are aware, the time TON and TOFF is fixed, typically hardcoded, for example by means of an RC delay or a counter, which should not come as a surprise, because fan motors are typically driven by low cost circuits, hence typically do not contain a programmable CPU but only a simple state-machine.

FIG. 10 shows a first embodiment of a method according to the present invention, having different modes of operation: a "normal mode" for starting and/or driving the fan in a classical manner, and a "special mode" for starting and/or driving the motor in a manner that deliberately heats-up the coil(s) and/or other parts of the motor more than in the normal mode, for the purpose of heating up the lubricant of the bearing. Which mode is chosen depends on the outcome of a test.

In more detail, in step 1001 a "value indicative of the bearing temperature" is measured. As mentioned above when discussing FIG. 1, this value can for example be a resistance value of a coil, or a junction voltage of the motor driver IC, or a resistance or voltage or current value of an external NTC, or any other suitable value. As mentioned before, "indicative of the bearing temperature" should be interpreted broadly. What is important is that the "measured value" has a correlation with the bearing temperature before the first start-up attempt after a relatively long stand-still, e.g. at least 15 minutes or at least 30 minutes. The idea is that the measured value can be used to decide, before starting-up, whether the lubricant temperature is relatively low, or not.

In step 1002 the measured value is compared to a predefined threshold, which depending on the implementation can be for example a predefined voltage, electrical resistance, current, temperature, etc.

If the outcome of the test means that the bearing temperature is lower than a predefined temperature, branch "Yes" in FIG. 10 is chosen, and a "special control algorithm" is performed in step 1003. If the outcome of the test of step 1002 means that the bearing temperature is higher than a predefined temperature, branch "No" is chosen, and the special control algorithm is skipped.

According to some embodiments of the present invention, the "special control algorithm" is deliberately chosen for pre-heating the coils during a predefined time period "Tpreheat", while keeping the motor substantially still, by applying suitable energizing signals, such as for example the energizing signals shown in FIG. 12, which will be discussed further, but the present invention is not limited to this particular waveform, and any other suitable waveform can also be used. Preferably, the waveform is chosen such that a current of maximal amplitude is temporarily applied in opposite directions, where the direction is reversed at a too high frequency for the motor to follow. The skilled person can easily find a suitable frequency, taking into account for example the inertia of the motor.

In some embodiments, the time period Tpreheat is a constant predefined time period, for example about equal to 1.0 seconds.

In other embodiments, the time period Tpreheat is a time period, which is not fixed, but is determined based on the measured value, for example by means of a look-up table or a mathematical function, or in any other way. This allows the preheating time to be chosen longer in case of lower environmental temperatures. Importantly, after the special preheating step 1003, the motor is substantially standing still, hence in step 1005, the classical start-up algorithm (with Ton/Toff equal to about 10%) can be applied, followed by the classical driving algorithm in step 1006. The method performed in step 1005 can be identical to the classical start-up method 801 shown in FIG. 8. The method performed in step 1006 can be identical to the classical driving method 802 shown in FIG. 8.

Stated in simple words, in this method 1000 a value is measured as an indication of the bearing temperature. If the bearing temperature is lower than a predefined threshold, a special preheating is performed, otherwise this preheating step is skipped. Then the classical start-up and drive method is applied. The main difference between the method of FIG. 10 and the method of FIG. 8 is indicated in gray shading.

As mentioned above, heating up the one or more coils is not a goal per se, but rather an indirect way for heating up the lubricant of the bearing in order to decrease the viscosity of the lubricant, and hence to decrease the load exerted on the motor at start-up. This is one of the underlying ideas of the present invention, inspired by the insight that even a small temperature increase of the lubricant, especially at temperatures as low as −40° C., will cause a decrease of the lubricant viscosity, and thus decreases the load of the motor, and thus increases the chance of starting the motor. Moreover, the proposed solution fits perfectly in the boundary condition that the complexity of the solution should not significantly increase the system cost or the system complexity.

For completeness it is noted that, depending on the value being measured, the test 1002 could be a test whether the measured value is larger than a threshold or smaller than a threshold, or larger than or equal to a threshold, or smaller than or equal to a threshold.

Figure 11:
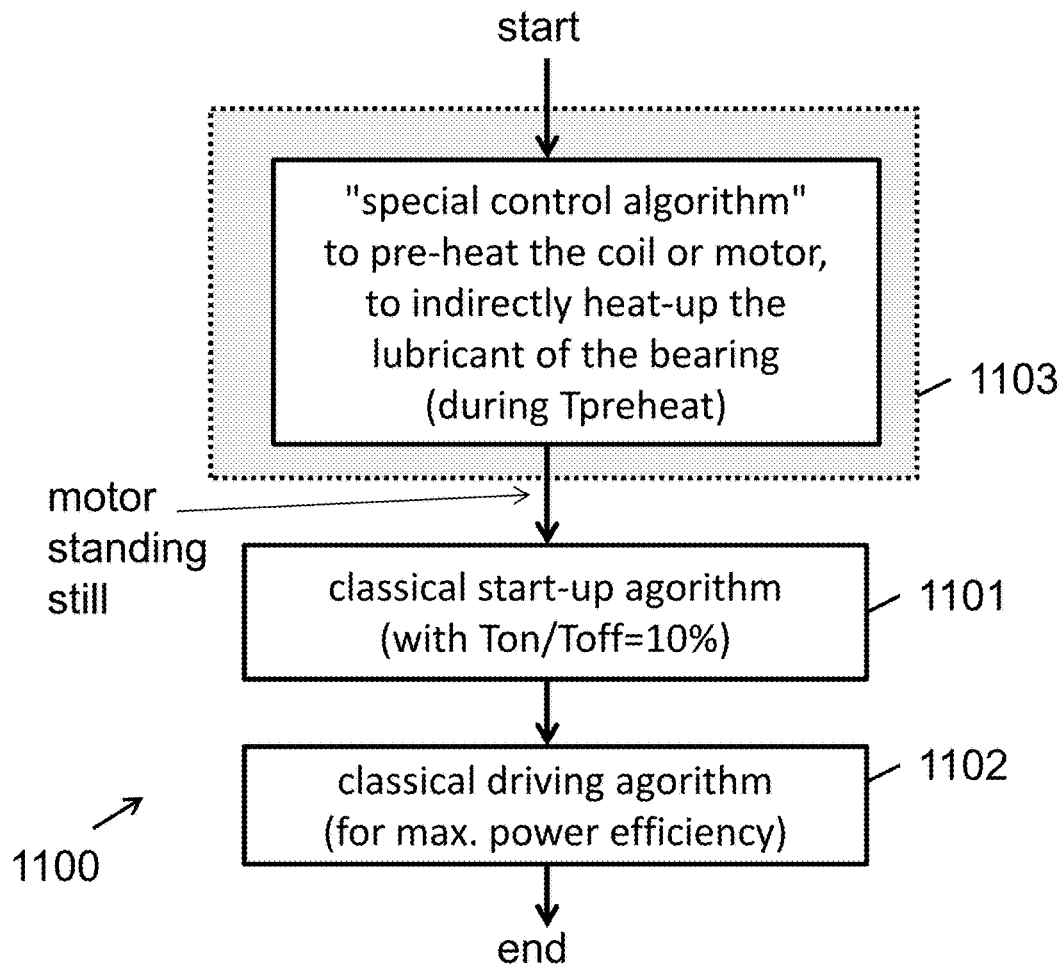
FIG. 11 shows a second embodiment of a method according to the present invention, wherein the one or more coil(s) are unconditionally pre-heated in a manner such that the rotor stays in a substantially stationary position before actually starting the motor.

FIG. 11 shows a second embodiment of a method according to the present invention, wherein the one or more coil(s) are unconditionally pre-heated in a manner such that the rotor stays in a substantially stationary position before actually starting the motor.

The method 1100 of FIG. 11 can be seen as a simplified version of the method 1000 of FIG. 10, where step 1001 and step 1002 are skipped, and the step 1003 is unconditionally performed at each start-up. Thus step 1101 can be identical to the classical start-up method 801 of FIG. 8, and step 1102 can be identical to the classical driving method 802 of FIG. 8.

In this embodiment, the preheating time Tpreheat is a constant predefined period. The skilled person can easily find a suitable time period by trial and error. It is contemplated that a time of 2.0 seconds is probably too high, and that a time in the order of about 0.1 s to about 1.0 s is a suitable time period, for example about 0.2 s or about 0.4 s or about 0.6 s or about 0.8 s.

The main advantage of the method 1100 is that it increases the chance of start-up, especially at temperatures as low as −40° C. A specific advantage of the method 1100 of FIG. 11 over the method 1000 of FIG. 10 is its simplicity. The main disadvantage of the method 1100 is that the "special action" is also performed in case the lubricant was already at a relatively high temperature (for example +50° C. or even more).

Stated in simple words, in this method 1100 a special preheating is performed unconditionally, and then the classical start-up and drive method is applied. The main difference between the method of FIG. 11 and the prior art method of FIG. 8 is indicated in gray shading.

Figure 12:
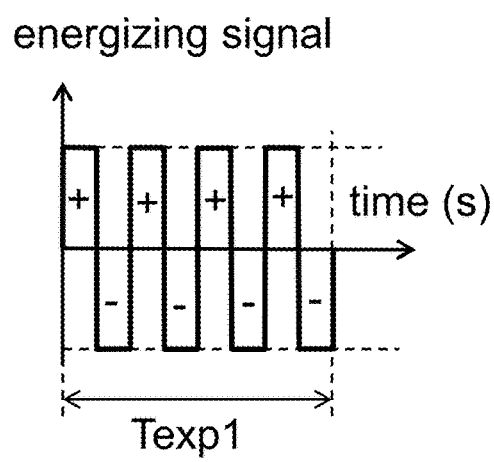
FIG. 12 shows an exemplary waveform as may be used in the method of FIG. 11.

FIG. 12 shows an example of such an energising signal, having alternating positive and negative energising pulses of preferably maximum power, which means in practice for example that substantially the full battery voltage Vbat is applied over the coil terminals (apart from a small voltage drop over the switches of the driver stage). In case of a three-phase motor, such an energising waveform may be applied to only one of the coils, to two of the coil at the same time, or to all three coils simultaneously.

In order to differentiate the pre-heating step with a "normal start-up" procedure (as illustrated in FIG. 5 or FIG. 6 or FIG. 7), the pulse width and frequency is suitable chosen such that there are at least two positive pulses and at least two negative pulses during the expected duration "Texp1" of the very first phase "phase1", preferably at least three positive pulses and at least three negative pulses, or at least five positive pulses and at least five negative pulses. On the other hand, the pulses must have a sufficiently long duration or duty cycle, such that the one or more coils are energised during at least 50% of the preheating time Tpreheat, preferably at least 75% of the expected duration "Texp1" described above.

In the specific example shown in FIG. 12, there are four positive pulses and four negative pulses during a predefined period, e.g. corresponding to the expected duration "Texp1" of the first phase at "normal startup" (at 25° C.), each pulse having a duration of 12.5% of said expected duration "Texp1" of the first phase "phase1", but the present invention is not limited thereto and other fractions can also be used, for example two positive pulses and two negative pulses having a duration of about 25% of the predefined period "Texp1".

Since the purpose of these pulses is to generate heat, the pre-heating step 1003 and 1103 preferably energizes the one or more coils at least during 100 ms in total, for example at least during 250 ms, e.g. more than 500 ms or even more than 1000 ms, or even more than 1 second, for example at least 2 seconds.

Of course many variants are possible, for example the duration of each of the pulses need not be constant, and there could be a small "dead zone" between the pulses, but the frequency at which the pulses change sign is chosen sufficiently high to prevent that the motor starts accelerating in a particular direction. At most, the fan motor may show a back and forth movement over an angle less than 90°, which is considered as substantially "standing still" for the purposes of the present invention.

Figure 13:
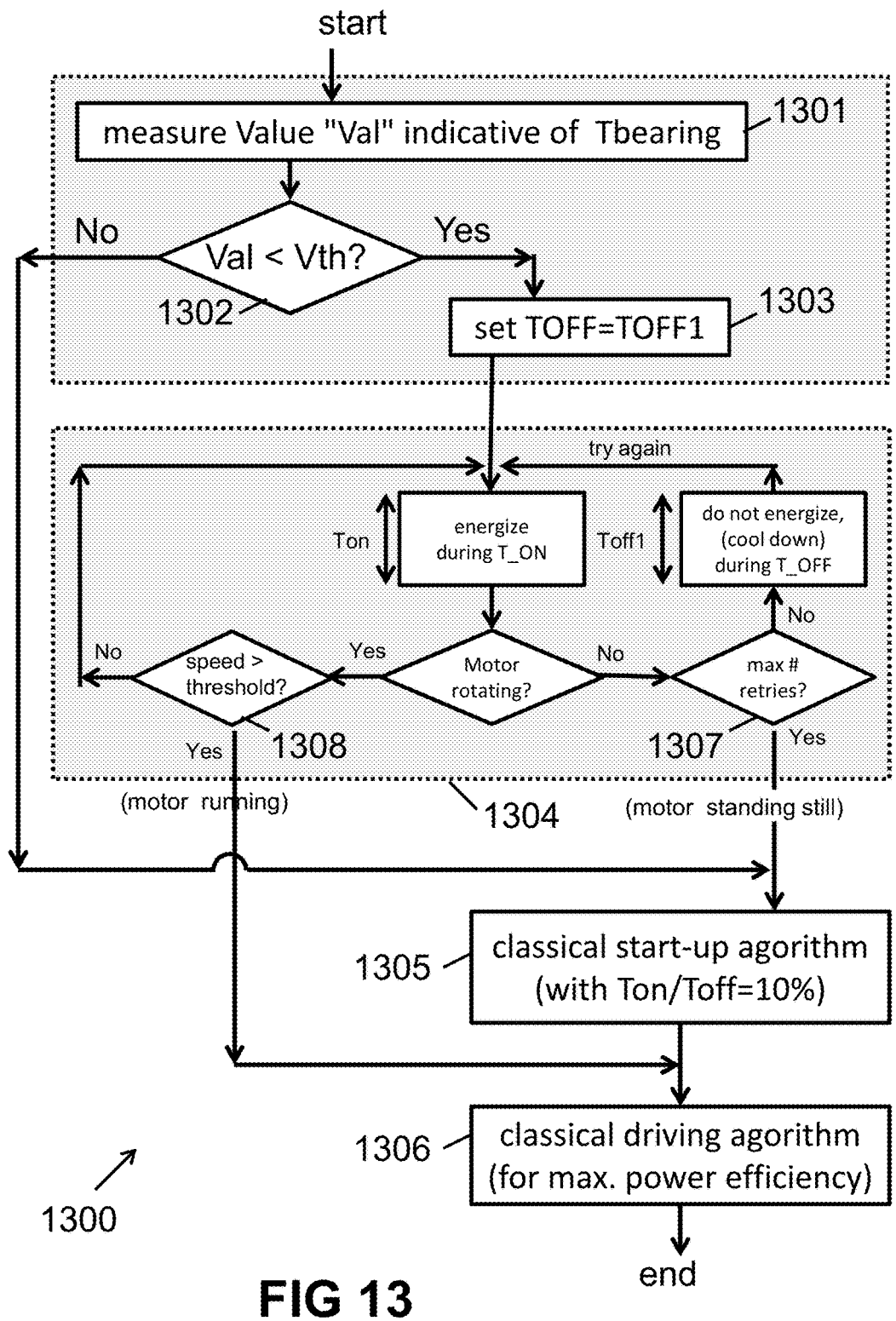
FIG. 13 shows a third embodiment of a method according to the present invention, wherein, depending on the outcome of a test, either a classical start-up is performed (with a typical 10% TON/OFF ratio), or a variant of the classical start-up with a much higher TON/TOFF ratio, deliberately chosen to heat-up the lubricant of the bearing (albeit indirectly).

FIG. 13 shows a third embodiment of a method 1300 according to the present invention, which can be seen as a special case of the method 1000 shown in FIG. 10.

In step 1301, a value indicative of the bearing temperature is measured, similar to above. In step 1302 it is tested whether this measured value is smaller than (or larger than) a predefined threshold value Vth, and if the outcome of the test means that the related bearing temperature is higher than a predefined temperature, (branch "No"), then the classical start-up method 1305 is performed, which may be identical to step 801 of FIG. 8, with a typical 10% TON/TOFF ratio, followed by the classical driving method 1306, which may be identical to step 802 of FIG. 8.

However, if the outcome of the test in step 1302 means that the bearing temperature is lower than a predefined temperature, (branch "Yes"), then step 1303 is performed wherein the TOFF value is set to a predefined first value TOFF1, and then step 1304 is performed which is identical to the step or subroutine 801, except that another OFF-time is used.

If in step 1307 it is found that the motor is not rotating after a predefined number of retries, step 1305 is performed, which is the classical start-up algorithm with Ton/Toff=10%.

If in step 1308 it is found that the motor is running at a sufficiently high speed, the classical start-up step 1305 can be skipped, and the classical driving algorithm can be performed in step 1306.

The experienced reader will recognize that the hardware for performing method step 1304 and method step 1305 can be largely based on the same hardware blocks, provided that the OFF-time is configurable, depending on the outcome of test 1302. This is a first major advantage of this method.

A second major advantage of this method as compared to the preheating steps described before, is that, rather than preheating the motor while keeping the rotor in a stationary position, in method 1300 immediate attempts are made to start-up the motor, and if the motor does not start, the one or more coils are implicitly preheated.

Figure 14:
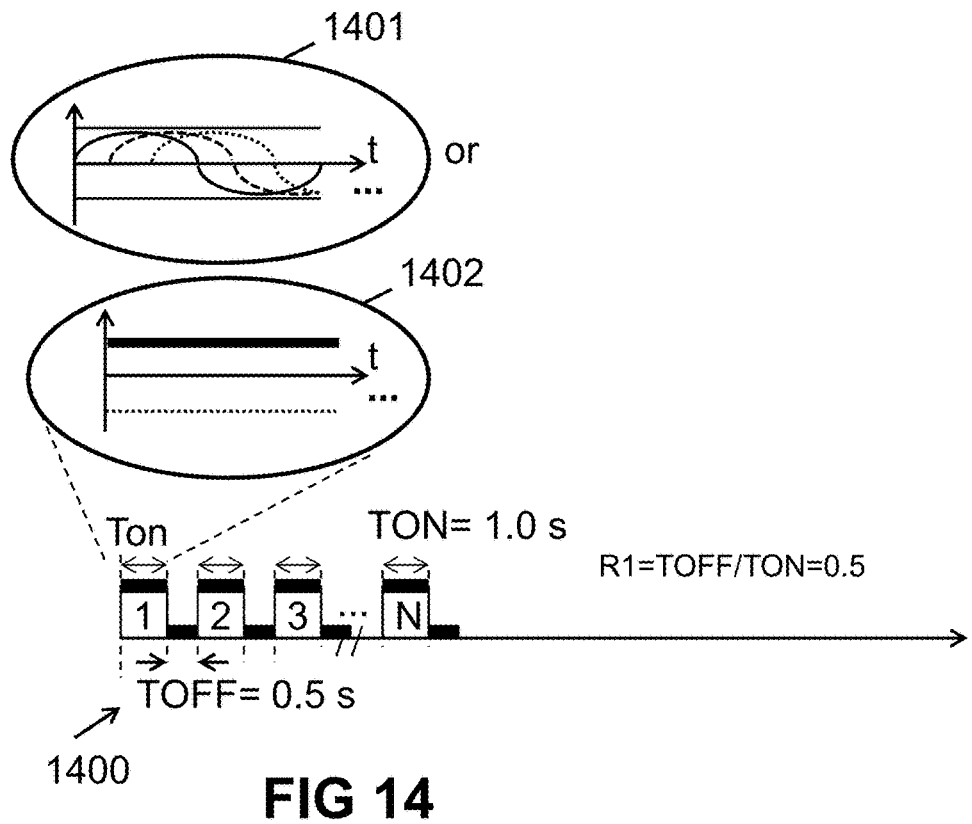
FIG. 14 is an example of an energizing scheme applied to the motor using a TON/TOFF ratio of 200% (TON=1.0 s and TOFF=0.5 s).

But a major difference with the prior art method of FIG. 8 is the very short cool-down period TOFF, which is much shorter than in the prior art, deliberately chosen to gradually increase the temperature of the one or more coils after multiple TON-periods. This difference is immediately clear by comparing the exemplary waveforms shown in FIG. 14 corresponding to method step 1304, and the exemplary waveforms of FIG. 9 corresponding to the prior art method step 801. As mentioned above, and illustrated in FIG. 14, the TOFF time of step 1304 is typically in the order of about 0.2 s to about 1.0 s, for example about 0.5 s for a TON-time of about 1.0 second. More generally, the ratio of TOFF/TON of this method can be any value in the range from 20% to 100%, for example a value in the range from 20% to 90%.

In a similar manner as described above, the test 1308 can be based on elapsed time rather than speed.

Figure 15:
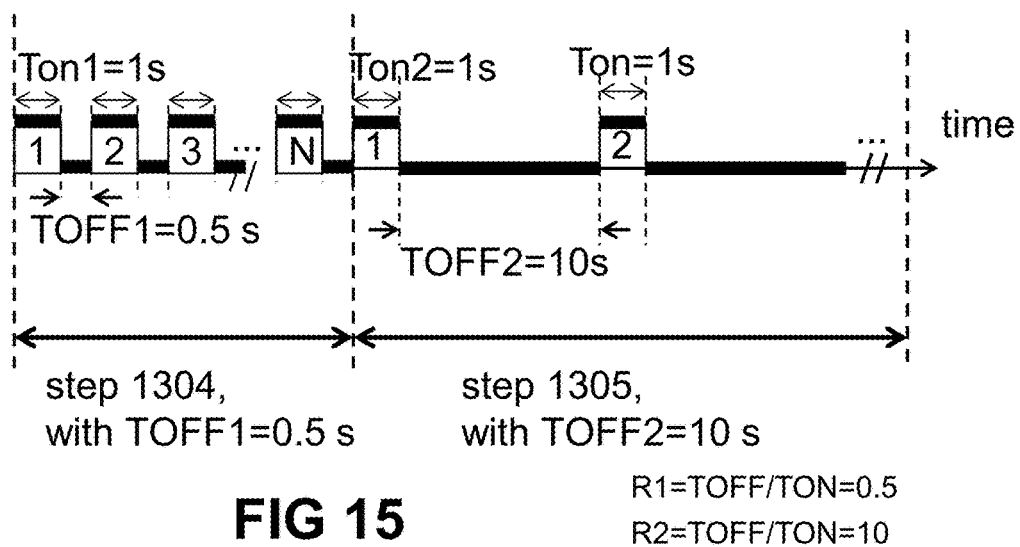
FIG. 15 shows an example of a pre-heating-start-up (with TON/TOFF=100%) followed by a normal start-up (with TON/TOFF=10%) as may be applied to the motor using the method of FIG. 13.

FIG. 15 shows a combined waveform as obtained by step 1304 (with TOFF equal to 0.5 s in the example), followed by the classical step 1305 (with TOFF equal to 10 s in the example). As can be appreciated from FIG. 15, the relatively long ON-periods and relatively short OFF periods of step 1304 will cause a temperature increase of the coil and/or other parts of the motor, including the bearing. In case the motor was not able to start even after a predefined number "N" attempts, the classical start-up method is used in order to prevent overheating of the coils. Like in the prior art, the TOFF2 period of about 10 second is chosen to allow cooling-down of the heat created during the ON-period.

In the example of FIG. 15, the TON1-periods of step 1304 have the same duration of the TON2-periods of step 1305, but of course that is not absolutely required for the present invention to work, and another TON1 period would also work, for example TON1 being about 0.4 s or 0.5 s or 0.6 s or 0.8 s, or any other suitable value.

In embodiments of the present invention, in step 1304 the ratio TON1/TOFF1 is preferably a value in the range from 50% to 200%, and the ratio TON2/TOFF2 of step 1305 is preferably in the range from 5% to 20%. For example, the TON1/TOFF1 ratio of step 1304 can be a factor of about 5 to 10 higher than the TON2/TOFF2 ratio, deliberately chosen to heat-up the lubricant of the bearing, albeit indirectly.

Figure 16:
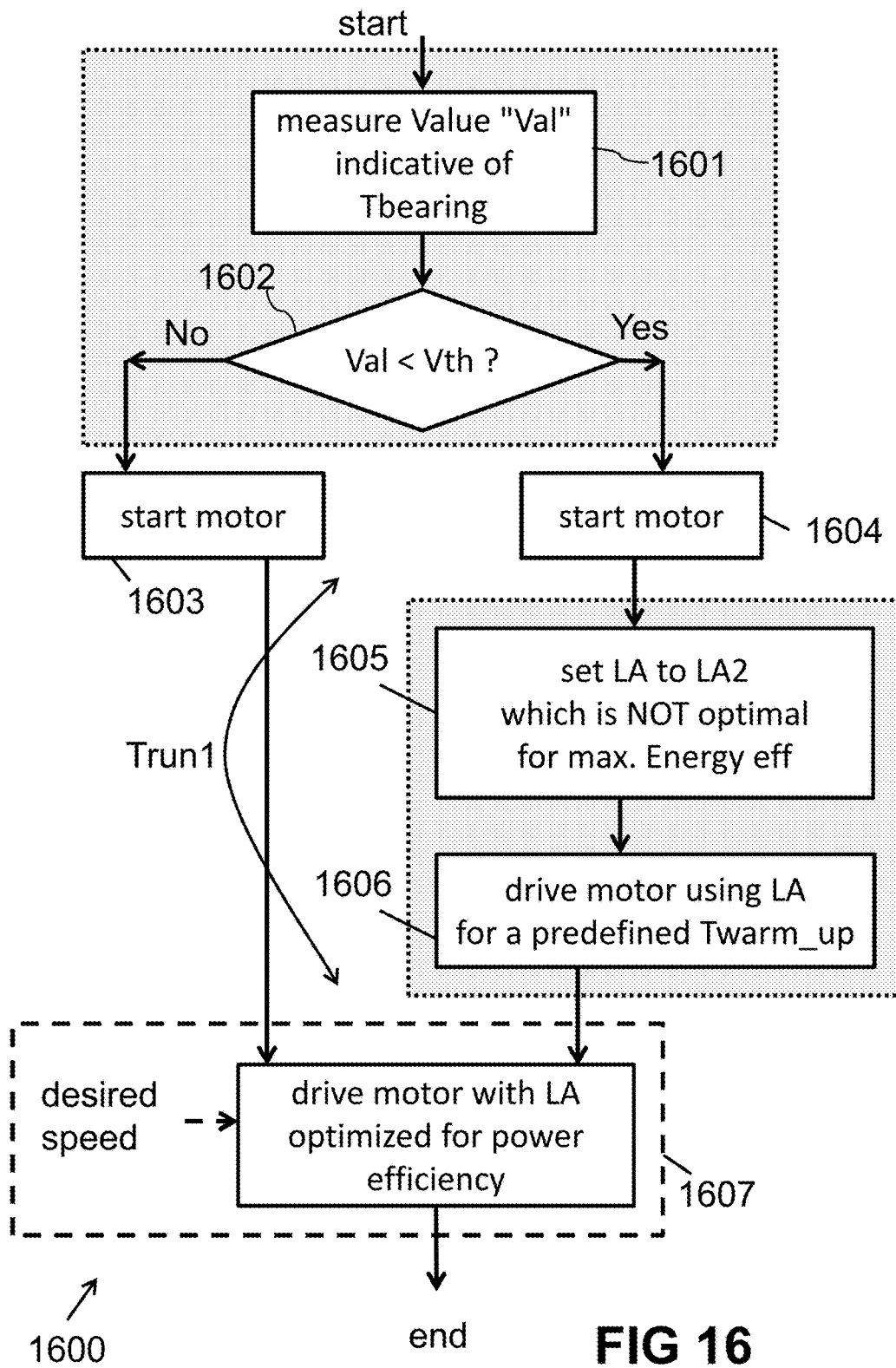
FIG. 16 shows a fourth embodiment of a method according to the present invention, where depending on the outcome of an initial test, and after the motor is started using a classical start-up method or a start-up method according to the present invention, the motor is deliberately being driven in an energy inefficient manner, before driving the motor in an energy efficient manner.

FIG. 16 shows a fourth embodiment of a method 1600 according to the present invention, where in a manner similar as explained above, a value indicative of the bearing temperature is measured in step 1601, which value is compared to a predefined threshold in step 1602. In both cases the motor is started in step 1603 and step 1604 respectively, which may be identical to the classical start-up method 801 of FIG. 8, but in case the outcome of the test 1602 means that the bearing temperature is "low" (e.g. lower than −20° C.) then a local driving parameter, e.g. Lead Angle LA is deliberately set to a non-energy-efficient value, and in step 1606 the motor is driven using this non-efficient driving parameter, e.g. LA. The driving algorithm itself can be identical to step 802 of FIG. 8, thus incorporating speed control, etc, but with the difference that it is deliberately operating in an energy inefficient mode for a predefined duration "Trun1", for example for about 0.5 minutes to about 5 minutes, for the purpose of deliberately heating up the lubricant of the bearing. After this period, step 1607 is performed, which may be identical to the classical driving step 802 of FIG. 8, running in power efficient mode.

In the example of FIG. 16 the parameter Lead-Angle is chosen, but other parameters causing the motor to generate more heat than needed, may also be chosen.

The attentive reader will again realize that the same hardware blocks may be re-used for performing step 1606 and step 1607. The main or only difference being that a driving parameter, for example Lead Angle LA, is either set to a value which is optimal or close to optimal in terms of power efficiency, or in contrast, is deliberately set to a value which is not optimal or far from optimal in terms of power efficiency. Although the terms "close and far" are relative terms, the fact that the driving circuit can be configured in two different modes, is a clear distinction over the prior art.

Like above, the gray areas in the drawing show the main differences with the prior art method of FIG. 8.

Combination of the Different Methods:

It is noted that the method of FIG. 10 and FIG. 11 (pre-heating before starting the motor), and the method of FIG. 13 (using a reduced OFF-time between retries during start-up attempts of the motor), and the method of FIG. 16 (using non-optimal value LA when the motor is running) can be combined.

TABLE 1 envisioned combinations

| Case | pre-heating, before start-up (see FIG. 10 or 12) | reduced TOFFbr, during start-up (see FIG. 13) | non-optimal LA, after start-up, (see FIG. 16) |
|---|---|---|---|
| C1 | No | no | yes |
| C2 | No | yes | no |
| C3 | No | yes | yes |
| C4 | yes | no | no |
| C5 | yes | no | yes |
| C6 | yes | yes | no |
| C7 | yes | yes | yes |

It is an advantage of case C4, C5, C6 and C7 that the temperature of the lubricant can be increased before even attempting to start the motor.

It is an advantage of case C2 and C3 that no time is lost for pre-heating, and that immediately attempts to start-up the motor are used.

A drive circuit according to the present invention may implement any of the cases C1 to C7.

In a variant of the method of FIG. 10, the first two steps 1001 and 1002 are performed in the same manner as described before, but then in an additional step (between step 1002 and before step 1003) one of the seven combinations of Table 1 is chosen. For example, in fans which don't require low speed operation at cold temperature, such as LED headlight fans, case C2 and case C6 could both be implemented, but the decision whether to actually perform C2 or C6 may depend on the initial value measured in step 1001. As an example, case C6 could be performed in case the initial temperature was lower than −20° C., and case C2 could be performed otherwise, but of course, other combinations are possible as well.

The invention claimed is:

1. A method of starting and/or driving a fan assembly, the fan assembly comprising a BLDC motor having one or more coils, and a bearing comprising a lubricant;
the method comprising the steps of:
performing a special action for intentionally heating up the one or more coils when starting the motor, and/or performing a special action for intentionally heating up the one or more coils while driving the motor;
starting the motor and driving the motor in a manner different from the special action;
wherein performing the special action comprises setting an off-time to a first predefined value and setting an on-time to a second predefined value, the first and second predefined value having a first ratio; and
wherein starting the motor comprises setting the off-time to a third value and setting the on-time to a fourth predefined value, the third and fourth predefined value having a second ratio larger than the first ratio.

2. The method according to claim 1, comprising the steps of:
a) determining an initial value indicative of a temperature of the bearing;
b) comparing the initial value with a predefined threshold value, and
if the result of the comparison indicates that the temperature of the bearing is lower than a predefined temperature, performing the special action for intentionally heating up the one or more coils; and
if the result of the comparison indicates that the temperature of the bearing is higher than a predefined temperature, skipping the special action.

3. The method according to claim 1, wherein performing the special action comprises performing a pre-heating by energizing the one or more coils in a manner to heat up the coils while keeping the motor substantially still.

4. The method according to claim 3, wherein performing a pre-heating comprises:
applying an energizing scheme to energize the one or more coils using at least two positive energizing pulses and at least two negative energizing pulses during a predefined time duration corresponding to an expected time of a first phase.

5. The method according to claim 4, wherein the total duration of the at least two energizing pulses during the pre-heating is at least 250 ms.

6. The method according to claim 1, wherein the second predefined value and the fourth predefined value are the same, and
wherein the first predefined value is smaller than the third predefined value.

7. The method of claim 6, wherein the first predetermined value is less than half of the third predefined value.

8. The method according to claim 1, wherein performing the special action comprises setting a driving parameter to a first value which is intentionally not optimal for energy efficiency; and
wherein driving the motor comprises setting the driving parameter to a second value different from the first value, which is substantially optimal for energy efficiency.

9. Use of the method according to claim 1 for starting and/or driving the motor at temperatures down to −40° C.

10. Use of the method according to claim 1 for starting the motor of an LED headlight fan of a wheeled vehicle at temperatures down to −40° C.

11. Use of the method according to claim 1 for driving the motor of a seat-heating-fan of a wheeled vehicle.

12. A system comprising:
a motor drive circuit comprising a timer unit, an energizing unit for energizing the one or more coils and control logic:
a fan assembly comprising a BLDC motor having one or more coils, and a bearing comprising a lubricant;
wherein said control logic is configured to perform a method comprising the steps of:
performing a special action for intentionally heating up the one or more coils when starting the motor, and/or performing a special action for intentionally heating up the one or more coils while driving the motor;

starting the motor and driving the motor in a manner different from the special action;

wherein performing the special action comprises setting an off-time to a first predefined value and setting an on-time to a second predefined value, the first and second predefined value having a first ratio; and wherein starting the motor comprises setting the off-time to a third value and setting the on-time to a fourth predefined value, the third and fourth predefined value having a second ratio larger than the first ratio.

13. The system of claim 12, wherein said motor drive circuit comprises:

sensing means for determining an initial value indicative of a temperature of the bearing;

the motor drive circuit configured for comparing the initial value with a predefined threshold value.

* * * * *